(12) United States Patent
Tsuboi (10) Patent No.: US 8,035,339 B2
(45) Date of Patent: Oct. 11, 2011

(54) POWER SUPPLY DEVICE AND PORTABLE ELECTRONIC DEVICE

(75) Inventor: Satoru Tsuboi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 291 days.

(21) Appl. No.: 12/279,513

(22) PCT Filed: Feb. 14, 2007

(86) PCT No.: PCT/JP2007/052557
§ 371 (c)(1),
(2), (4) Date: Apr. 3, 2009

(87) PCT Pub. No.: WO2007/094334
PCT Pub. Date: Aug. 23, 2007

(65) Prior Publication Data
US 2010/0001690 A1    Jan. 7, 2010

(30) Foreign Application Priority Data

Feb. 16, 2006  (JP) .................................. 2006-040047

(51) Int. Cl.
*H02J 7/00* (2006.01)
(52) U.S. Cl. .......................... 320/107; 320/113; 320/115
(58) Field of Classification Search .................. 320/107, 320/115
See application file for complete search history.

(56) References Cited

U.S. PATENT DOCUMENTS

| | | | |
|---|---|---|---|
| 5,912,546 A | 6/1999 | Sakou et al. | |
| 6,377,021 B2 * | 4/2002 | Duerbaum et al. | ........... 320/107 |
| 6,433,509 B2 * | 8/2002 | Kobayashi et al. | ........... 320/107 |
| 6,563,290 B2 | 5/2003 | Sakakibara et al. | |
| 6,636,750 B1 * | 10/2003 | Zurek et al. | ................ 455/569.1 |
| 6,788,026 B2 | 9/2004 | Muramatsu | |
| 2003/0042868 A1 | 3/2003 | Muramatsu | |

FOREIGN PATENT DOCUMENTS

| | | |
|---|---|---|
| EP | 1217710 A1 | 6/2002 |
| JP | 11-068322 | 3/1999 |
| JP | 11-122333 | 4/1999 |
| JP | 2000-195561 | 7/2000 |
| JP | 2000195561 A | 7/2000 |
| JP | 2003-079061 | 3/2003 |

OTHER PUBLICATIONS

European search report dated Sep. 6, 2010 for corresponding European application No. 07714135.6 lists the references above.

* cited by examiner

*Primary Examiner* — M'Baye Diao
(74) *Attorney, Agent, or Firm* — DLA Piper LLP (US)

(57) ABSTRACT

A power supply device capable of reducing noise intruding into connecting terminals for signal input or output will be provided. A cradle device 3 has a case 18; a positive supply terminal 21P and a negative power supply terminal 21N exposed from the case 18; a charger 52 provided inside the case and setting the positive power supply terminal 21P and the negative power supply terminal 21 at constant potentials being different from each other; an input terminal 21S exposed from the case 18 and arranged between the positive power supply terminal 21P and the negative power supply terminal 21N adjacent to the positive power supply terminal P and the negative power supply terminal 21N; and an amplifier 51 provided inside the case 18 and operating based on a signal input into the input terminal 21S.

7 Claims, 6 Drawing Sheets

POWER SUPPLY DEVICE AND PORTABLE ELECTRONIC DEVICE

CROSS-REFERENCE TO THE RELATED APPLICATIONS

This application is a national stage of international application No. PCT/JP2007/052557 filed Feb. 14, 2007, which also claims the benefit of priority under 35 USC 119 to Japanese Patent Application No. 2006-040047 filed Feb. 16, 2006, the entire contents of which are incorporated herein by reference.

TECHNICAL FIELD

The present invention relates to a power supply device supplying electric power to a mobile phone or other electronic device and a portable electronic device connected to the power supply device.

BACKGROUND ART

Known in the art is the technology providing a speaker, an amplifier, etc. in a charging stand (power supply device) for charging a battery of a mobile phone, converting an audio signal generated in the mobile phone to sound by the speaker of the charging stand, and outputting the sound (Patent Document 1). The charging stand of Patent Document 1 is provided with, in addition to terminals for supplying electric power to the mobile phone, an input terminal receiving as input an audio signal. If the mobile phone is placed on the charging stand for charging, an output terminal provided at the mobile phone and the input terminal of the charging stand will abut against each other. The audio signal generated at the mobile phone is output via the output terminal and the input terminal to the charging stand.

Note that the technology of forming terminals of a charging stand by wire members made of a metal, forming helical portions in the middle of the wire members, and making the terminals of the charging stand and the terminals of the mobile phone abut against each other by a biasing force of the helical portion is known as well (Patent Document 2).

Patent Document 1: Japanese Patent Publication (A) No. 2003-79061
Patent Document 2: Japanese Patent Publication (A) No. 2000-195561

DISCLOSURE OF THE INVENTION

Problems to be Solved by the Invention

Connecting terminals are exposed from a case, therefore are easily struck by external radio waves or other electromagnetic waves. Further, static electricity from the hand of a user or the case surface is apt to flow into the device. Namely, noise easily enters from the connecting terminals. Further, the entry of noise causes a drop in the sound quality of the speaker of the charging stand etc. However, Patent Document 1 does not disclose reduction of the entry of noise.

It is therefore desirable to provide a power supply device able to reduce the entry of noise into connecting terminals for signal input/output and a portable electronic device connected to the power supply device.

Means for Solving the Problem

A power supply device of the present invention has a case; a first power supply terminal and a second power supply terminal exposed from the case; a power supply unit provided inside the case and configured to set the first power supply terminal and the second power supply terminal at different constant potentials; an input terminal exposed from the case and arranged between the first power supply terminal and the second power supply terminal adjacent to the first power supply terminal and the second power supply terminal; and an operation unit provided inside the case and configured to operate based on a signal input into the input terminal.

Preferably, the device is provided with a circuit board which is provided inside the case and on which a power supply line connecting the first power supply terminal and the power supply unit, a reference potential line connected to the second power supply terminal, and an input signal line connecting the input terminal and the operation unit are formed, at least a portion of the power supply line extending along the input signal line.

Preferably, at least a portion of the input signal line is arranged between the power supply line and the reference potential line.

Preferably, the first power supply terminal, the second power supply terminal, and the input terminal are configured including conductive wire members, each conductive wire member has a fixed end fixed to the circuit board, a free end exposed from the case and capable of oscillating in an inward and outward direction of the case, and a helical portion formed between the fixed end and the free end, and biasing the free end to the outward direction of the case by a restoration force in a winding direction or unwinding direction, and the first power supply terminal, the second power supply terminal, and the input terminal are arranged parallel to each other so that their helical portions are coaxially adjacent to each other.

A portable electronic device of the present invention is a portable electronic device supplied with electric power from a power supply device having a case, a first power supply terminal and a second power supply terminal exposed from the case, a power supply unit provided inside the case and configured to set the first power supply terminal and the second power supply terminal at constant potentials being different from each other, an input terminal exposed from the case and arranged between the first power supply terminal and the second power supply terminal adjacent to the first power supply terminal and the second power supply terminal, and an operation unit provided inside the case and configured to operate based on a signal input into the input terminal, which device has a portable case; a first power receiving terminal, a second power receiving terminal, and an output terminal exposed from the portable case, capable of abutting against and electrically connecting with each of the first power supply terminal, the second power supply terminal, and the input terminal and capable of carrying power when attaching the portable case to the power supply device; a charge unit charging electric power supplied to the first power receiving terminal and the second power receiving terminal to a battery connected to the portable case; and a signal generation unit driven by at least one electric power between electric power supplied to the first power receiving terminal and second power receiving terminal and electric power from the battery, and configured to generate signals to be output to the output terminal.

Preferably, the signal generation unit is configured to generate an audio signal.

Preferably, the device has a connector, provided in the portable case and enabling connection between an internal circuit of the portable case and an external circuit of the portable case. The first power receiving terminal or the second power receiving terminal is provided at a position nearer the connector than the output terminal.

Effect of the Invention

According to the present invention, entry of noise into the connecting terminals for signal input/output can be reduced.

DESCRIPTION OF NOTATIONS

1 . . . mobile phone unit (portable electronic unit), 2 . . . mobile phone (portable electronic device), 3 . . . cradle device (external speaker device), 5 . . . receiver case (portable case), 6 . . . transmitter case (portable case), 18 . . . case, 21P . . . positive power supply terminal, 21N . . . negative power supply terminal, 12S . . . input terminal, 23 . . . speaker, 33 . . . audio processing unit (signal generation unit), 51 . . . amplifier (operation unit), and 52 . . . charger (power supply unit).

BEST MODE FOR CARRYING OUT THE INVENTION

Figures 1A, 1B, 1C:
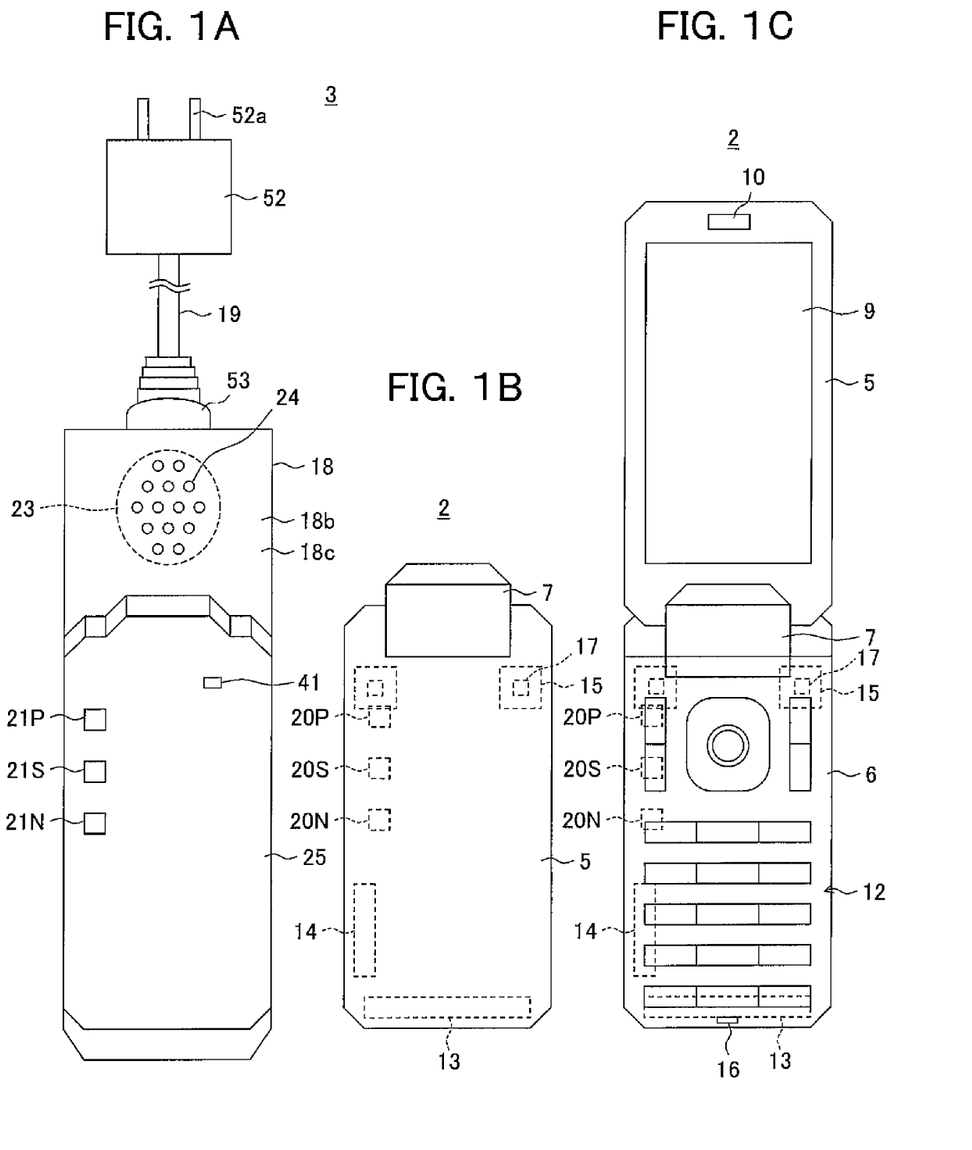
FIG. 1 Front views including partial see-through views showing a mobile phone and a cradle device of a portable electronic unit according to an embodiment of the present invention.

FIG. 1A to FIG. 1C are plan views including partial see-through views showing a mobile phone unit (portable electronic unit) 1 configured by a mobile phone 2 and a cradle device 3 according to a first embodiment of the present invention, in which FIG. 1A shows the cradle device 3, FIG. 1B shows the mobile phone 2 in a closed state, and FIG. 1C shows the mobile phone 2 in an open state. Note that, the mobile phone 2 is an example of the portable electronic device, and the cradle device is an example of the power supply device.

Figure 2A:
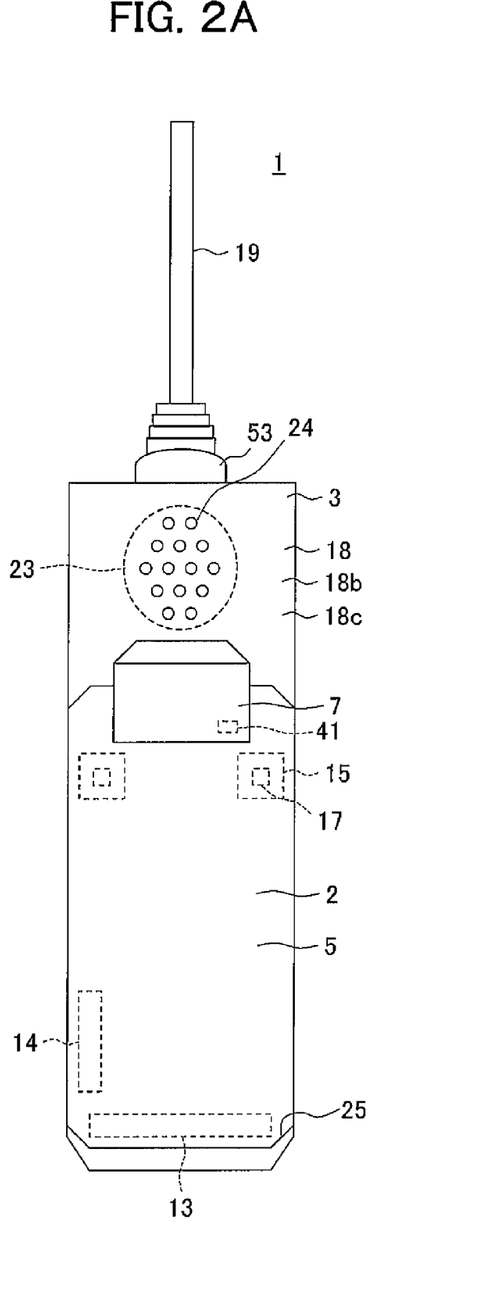
FIG. 2 Front views including partial see-through views showing the portable electronic unit of FIG. 1A to FIG. 1C in a state where the mobile phone is placed on the cradle device.
Figure 2B:
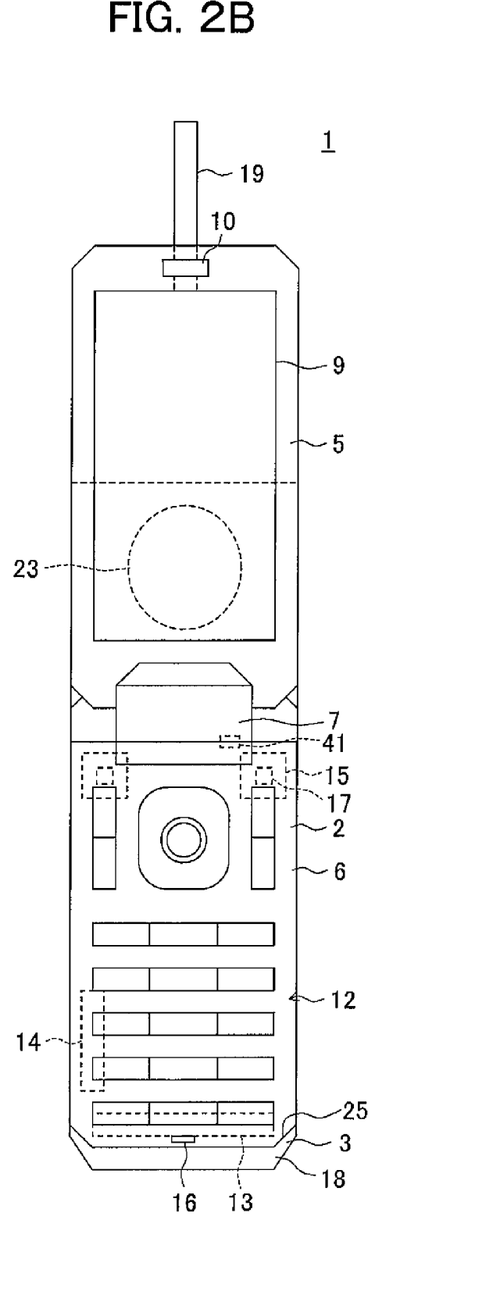

FIG. 2A and FIG. 2B are plan views including partial see-through views showing a state where the mobile phone 2 is placed on the cradle device 3, in which FIG. 2A shows a case where the mobile phone 2 is closed, and FIG. 2B shows a case where the mobile phone 2 is opened.

Figure 3A:
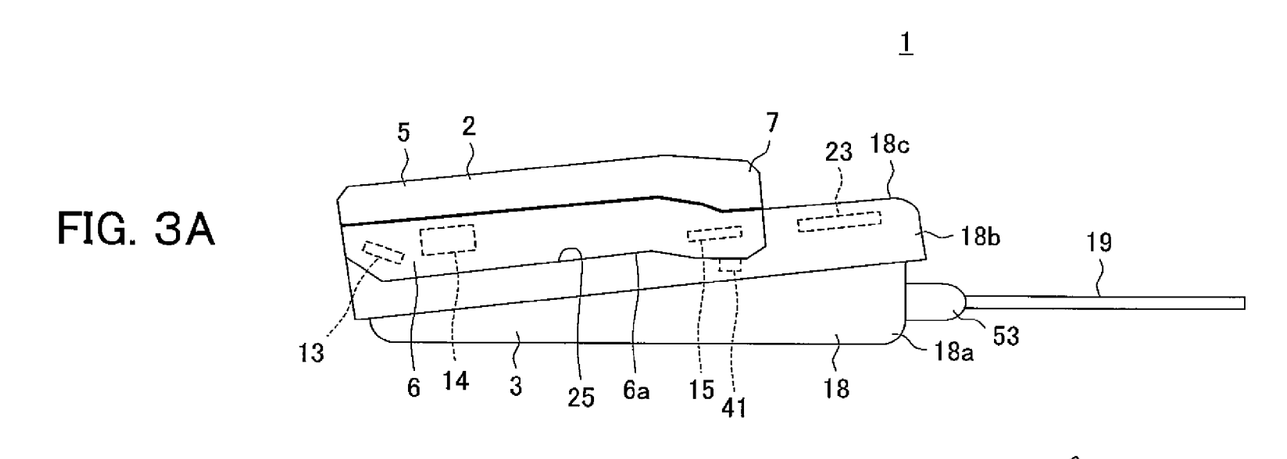
FIG. 3 Side views including partial see-through views showing the portable electronic unit of FIG. 1A to FIG. 1C in a state where the mobile phone is placed on the cradle device.
Figure 3B:
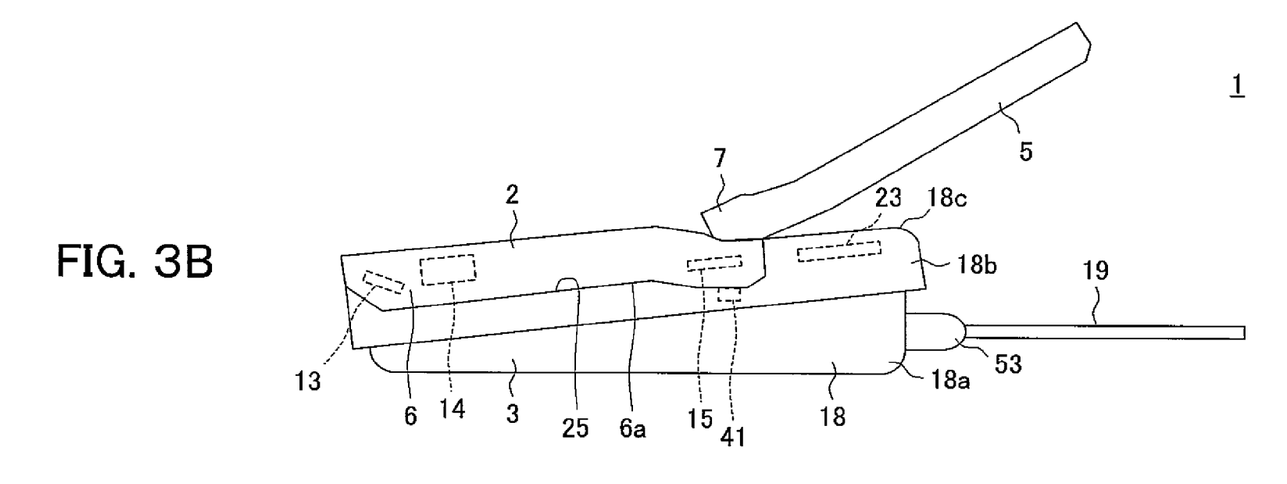

FIG. 3A and FIG. 3B are side views including partial see-through views showing the state where the mobile phone 2 is placed on the cradle device 3, in which FIG. 3A shows the case where the mobile phone 2 is closed, and FIG. 3B shows the case where the mobile phone 2 is opened.

The receiver case 5 and the transmitter case 6 are connected in their end portions by a connecting unit 7. The mobile phone 2 can be opened/closed pivoting about the connecting unit 7. The receiver case 5 and the transmitter case 6 are formed to generally thin parallelepipeds, are superimposed on each other in the closed state, and are shaped so that their contours approximately coincide with each other when viewing the other case side from one case side.

The receiver case 5 is formed by for example a plastic in a generally thin parallelepiped shape. The receiver case 5 is provided with a display unit 9 displaying images on a facing surface facing the transmitter case 6 in the closed state. The display unit 9 is configured by for example a liquid crystal display. Note that, the receiver case 5 is provided with, other than this, a speech use speaker 39 (see FIG. 5). A sound emitting hole 10 of the speaker is provided in the facing surface.

The transmitter case 6 is formed by for example a plastic in a generally thin parallelepiped shape. The transmitter case 6 is provided with an operation unit 12 accepting an operation of the user, a main antenna 13 and a sub antenna 14 performing transmission/reception of radio waves, speakers 15 outputting a report sound etc., a speech use microphone 35 (see FIG. 5), a sound collecting hole 16 of the microphone 35, and sound emitting holes 17 of the speakers 15.

On a back surface side of the transmitter case 6 (opposite side to the surface facing the receiver case 5 in the closed state), a positive power receiving terminal 20P and a negative power receiving terminal 20N supplied with electric power for charging a battery 38 (see FIG. 5) and an output terminal 20S for outputting an audio signal (hereinafter simply referred to as "terminals 20" and sometimes not discriminated) are exposed. Note that the positive power receiving terminal 20P and negative power receiving terminal 20N are examples of the first power receiving terminal and the second power receiving terminal.

The cradle device 3 is provided with a case 18, a charger 52 (FIG. 1A) for supplying electric power to the cradle device 3, a mechanical switch 41 for detecting placement of the mobile phone 2, and a speaker 23 converting an audio signal generated at the mobile phone 2 to sound and outputting the same. Note that the charger 52 is an example of the power supply unit.

Further, in the cradle device 3, a positive power supply terminal 21P and a negative power supply terminal 21N for supplying electric power to the mobile phone 2 and an input terminal 21S receiving as input an audio signal from the mobile phone 2 (hereinafter simply referred to as the "terminals 21" and sometimes not discriminated) are exposed. Note that the positive power supply terminal 21P and the negative power supply terminal 21N are examples of the first power supply terminal and the second power supply terminal.

The case 18 is provided with a lower cover 18a placed on for example a desk and an upper cover 18b covering the lower cover 18a. The lower cover 18a and upper cover 18b are formed by for example a plastic. The upper cover 18b is covered on the lower cover 18a to be inclined with respect to the surface on which the case 18 is placed, and the case 18 is formed in a trapezoidal shape having an inclined surface 18c inclined with respect to the placed surface (desk surface etc.) as a whole.

In the top surface of the case 18, a recess (placement portion) 25 for placing the mobile phone 2 is formed. The recess 25 is provided below the inclined surface 18c. The recess 25 is formed to a shape enabling the transmitter case 6 of the mobile phone 2 to be fit into it and is formed so that a bottom portion against which the back surface of the transmitter case 6 abuts is inclined with respect to the surface (desk surface etc.) on which the cradle device 3 is placed. The mobile phone 2 is placed on the cradle device 3 by fitting and inserting the transmitter case 6 in the recess 25 while making the connecting unit 7 side face toward the upward side of the inclined surface 18*c*.

As shown in FIG. 3A and FIG. 3B, the depth of the recess 25 is schematically equivalent to or lower than the thickness of the transmitter case 6. Accordingly, in a state where the mobile phone 2 is placed in the recess 25, even if the mobile phone 2 is opened/closed, a circumferential edge of the recess 25 of the inclined surface 18*c* does not abut against the receiver case 5, and opening/closing of the mobile phone 2 is not hindered.

The charger 52 is configured by an AC adapter and connected to an electric circuit inside the case 18 by a cord 19. The charger 52 is provided with a power supply terminal 52*a*. By insertion of the power supply terminal 52*a* into a power supply receptacle for supplying electric power having a commercial frequency, electric power from an external power source is input. The charger 52 converts AC current supplied from the external power source to DC current having an appropriate voltage and supplies electric power via the cord 19 to the circuit board inside the case 18.

Note that a connector 53 is provided at an end portion on the case 18 side of the cord 19. The connector 53 can be connected to or detached from a not shown connector provided in the case 18 and can be connected to or detached from a not shown connector provided in the mobile phone 2. Namely, the connector 53 may be connected to the mobile phone 2 to directly charge the mobile phone 2 by the charger 52 as well.

The mechanical switch 41 is configured by for example a depression type switch, is turned on by placement of the mobile phone 2 in the recess 25, and is turned off by detachment of the mobile phone 2 from the recess 25.

The speaker 23 is provided on the upper side of the inclined surface 18*c* compared to the recess 25. The speaker 23 is arranged so that the sound emitting surface faces the back surface of the inclined surface 18*c* (to face upward). Sound emitting holes 23 for releasing the sound output by the speaker 23 are provided in the inclined surface 18*c*.

Figure 4A:
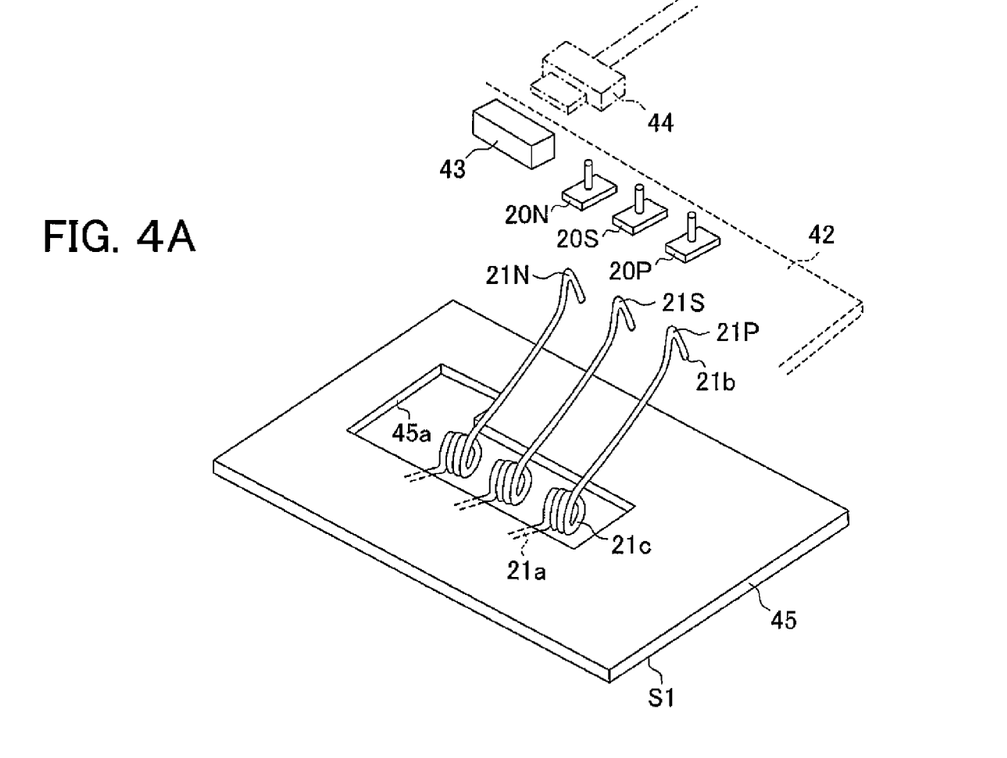
FIG. 4 Diagrams explaining a connecting method of the mobile phone and the cradle device of FIG. 1A to FIG. 1C.
Figure 4B:
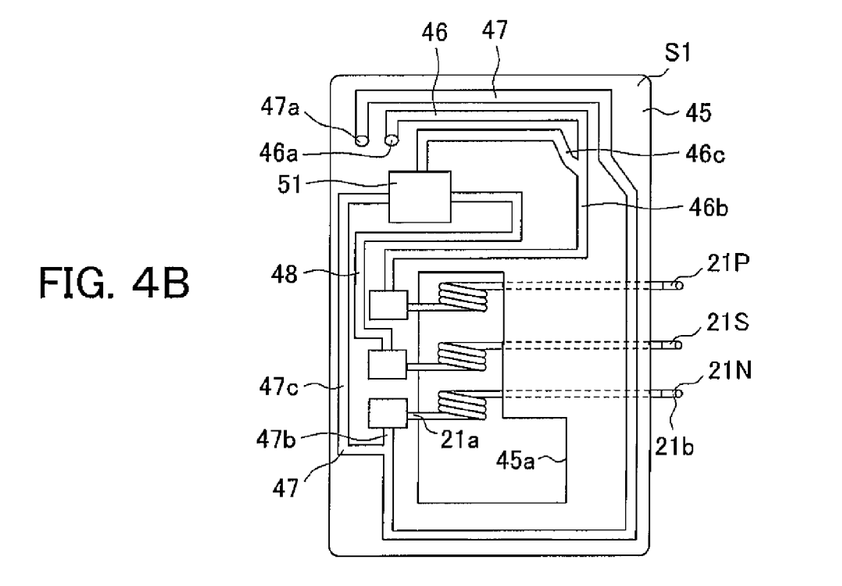

FIG. 4A and FIG. 4B are diagrams explaining an electric connecting method of the mobile phone 2 and the cradle device 3, in which FIG. 4A is a perspective view of internal portions of the mobile phone 2 and the cradle device 3, and FIG. 4B is a back surface view of the circuit board inside the cradle device 3 (diagram seen from below FIG. 4A). Note that, in FIG. 4A, the right side on the sheet surface is the upper side of the sheet surface of FIG. 1A to FIG. 1C. Further, FIG. 4B conceptually shows a pattern etc. of a conductive layer of the circuit board. Details are omitted.

A circuit board 42 is provided inside the transmitter case 6 of the mobile phone 2. The circuit board 42 is configured by for example a printed circuit board using plastic as the base. On the circuit board 42, an IC (not shown), terminals 20, a connector 43, and various other electronic parts are mounted.

As shown in FIG. 1B and FIG. 4A, three terminals 20 of the mobile phone 2 are arranged on a line in the order of the positive power receiving terminal 20P, output terminal 20S, and negative power receiving terminal 20N from the connecting unit 7 side (right side of the sheet surface in FIG. 4A and FIG. 4B). Namely, the output terminal 20S is sandwiched between the positive power receiving terminal 20P and the negative power receiving terminal 20N. Note that the direction of arrangement may be appropriately set, for example be a direction along the edge portion of the circuit board 42.

The terminal 20 is constituted by a metal or other conductive material and is provided with a plate-shaped contact portion 20*a* and a conductive portion 20*b* electrically connecting the contact portion 20*a* and the circuit board 42. The contact portion 20*a* is provided at the back surface side from the circuit board 42 (lower side of the sheet surface in FIG. 4A and FIG. 4B) and exposed from a not shown opening formed in the back surface of the transmitter case 6. The conductive portion 20*b* is extended from the contact portion 20*a* to the circuit board 42 and connected to the conductive pattern of the circuit board 42.

The connector 43 is for electrically connecting the mobile phone 2 with another device. In other words, it is for electrically connecting the circuit inside the case of the mobile phone 2 and a circuit outside the case of the mobile phone 2. The other device is for example another mobile phone, a digital camera, or a notebook personal computer.

The connector 43 is provided at the edge portion of the circuit board 42 and can be exposed from the side surface of the transmitter case 6 (left side of the sheet surface of FIG. 1B). A recess (not shown) into which a connector 44 of the other apparatus is inserted is provided in the exposed portion of the connector 43. In the recess, a terminal (not shown) electrically connected to the circuit board 42 and abutting against the terminal of the connector 44 of the other apparatus is arranged.

The connector 43 is aligned after the three terminals 20 and arranged on the negative power receiving terminal 20N side. Namely, the negative power receiving terminal 20N is arranged at a position nearer the connector 43 than the output terminal 20S. Note that the connector 43 may be arranged on the positive power receiving terminal 20P side as well.

Inside the case 18 of the cradle device 3, a circuit board 45 is provided. The circuit board 45 is for example a printed circuit board using a plastic as a base. The circuit board 45 is constituted as a single-surface board having a mount surface S1 on the bottom side of the cradle device 3 (lower side of the sheet surface of FIG. 4A). Namely, the circuit board 45 is provided with a conductive pattern layer on only one side of a base formed by a plastic insulating layer. However, the circuit board 45 may be one having mount surfaces on both surfaces as well. On the circuit board 45, terminals 21, an amplifier 51, and other various electronic parts are mounted. Note that, the amplifier 51 is an example of the operation unit.

The terminal 21 is constituted by a metal or other wire member having conductivity. The terminal 21 has a fixed end 21*a* fixed to the circuit board 45 and a free end 21*b* capable of rocking with respect to the circuit board 45 (case 18 of the cradle device 2). The terminal 21 is inserted through an opening 45*a* formed in the circuit board 45, the fixed end 21*a* is arranged on the mount surface S1 side of the circuit board 45, and the free end 21*b* is arranged on the opposite side to the mount surface S1. The terminal 21 is extended to an extent so that the free end 21*b* is located outside of the circuit board 45 when viewing the plan view. The fixed end 21*a* is fixed to the mount surface S1 of the circuit board 45 and electrically connected to the circuit board 45. The free end 21*b* has a convex portion projecting upward. The convex portion can rock between a position projecting to the outside of the case from the opening formed in the bottom portion of the recess 25 of the cradle device 3 and a position retracted to the inside of the case from the projecting position.

When the mobile phone 2 is placed in the recess 25 of the cradle device 3, contact portions 20*a* of the positive power receiving terminal 20P, negative power receiving terminal 20N, and output terminal 20S of the mobile phone 2 abut against convex portions of free ends 21*b* of the plus power supply terminal 21P, negative power supply terminal 21N, and input terminal 21S of the cradle device 3. Due to this, the mobile phone 2 and the cradle device 3 are electrically connected to each other.

In the middle from the fixed ends 21a to the free ends 21b, helical portions 21c formed by winding the wire members an appropriate number of times are provided. Specifically, the helical portions 21c are arranged in the opening 45a of the circuit board 45. The positive power supply terminal 21P, negative power supply terminal 21N, and input terminal 21S are arranged parallel to each other so that helical portions 21c are coaxially adjacent to each other. If the mobile phone 2 is placed in the recess 25, and free ends 21b of the terminals 21 of the cradle device 3 are pushed to the internal side of the case of the cradle device 3 by the terminals 20 of the mobile phone 2, the helical portions 21c resiliently deform in the winding direction and bias the free ends 21b to the outside of the case by the restoration force to the unwinding direction. Note that the helical portions 21c may be constituted so as to bias the free ends 21b to the outside of the case by the restoration force to the winding direction as well.

As shown in FIG. 4B, the circuit board 45 is provided with a power supply line 46, a reference potential line 47, and an input signal line 48. Each line is formed by printing of a conductive pattern on the insulating plastic forming the base of the circuit board 45. Note that, each line is covered by an insulation film.

The power supply line 46 connects the charger 52, the positive power supply terminal 21P, etc. Specifically, the power supply line 46 is extended from a connecting unit 46a connected to the line having the positive potential of the charger 52 and branched to a terminal side line 46b and an amplifier side line 46c in the middle. The terminal side line 46b is extended up to the fixed end 21a of the positive power supply terminal 21P and connected to the fixed end 21a. The amplifier side line 46c is extended up to the amplifier 51 and connected to the amplifier 51.

The reference potential line 47 holds the reference potential of the circuit board 45. Further, the reference potential line 47 connects the charger 52, negative power supply terminal 21N, etc. Specifically, the reference potential line 47 is extended from a connecting unit 47a connected to the line having negative potential of the charger 52 and branched to a terminal side line 47b and an amplifier side line 47c in the middle. The terminal side line 47b is extended up to the fixed end 21a of the negative power supply terminal 21N and connected to the fixed end 21a. The amplifier side line 47c is extended up to the amplifier 51 and connected to the amplifier 51. The reference potential line 47 is provided so as to circle the circuit board 45 one time along the edge portion of the circuit board 45.

Note that by the positive power supply terminal 21P, the negative power supply terminal 21N, and charger 52 being connected as described above, the potential of the negative power supply terminal 21N is set at the reference potential (constant potential), the potential of the positive power supply terminal 21P is set at the constant potential different from (higher than) the reference potential, and the DC power is supplied between the positive power supply terminal 21P and the negative power supply terminal 21N.

The input signal line 48 is extended from the fixed end 21a of the input terminal 21S to the amplifier 51 and connects the input terminal 21S and the amplifier 51.

At least a portion of the input signal line 48 is extended along the power supply line 46. Specifically, it is extended from the fixed end 21a of the input terminal 21S to the fixed end 21a of the positive power supply terminal 21P and extended from near the fixed end 21a of the positive power supply terminal 21P parallel and adjacent to the power supply line 46. Note that the entire input signal line 48 may be extended along the power supply line 46 as well. Further, at least a portion of the power supply line 46 is extended along the input signal line 48.

Further, at least a portion of the input signal line 48 is extended along the reference potential line 47. Specifically, the reference potential line 47 is extended from the fixed end 21a of the negative power supply terminal 21N to the fixed end 21a direction of the input terminal 21S, and the input signal line 48 is extended from near the fixed end 21a of the input terminal 21S parallel and adjacent to the reference potential line 47. Further, from near the fixed end 21a of the positive power supply terminal 21P, the input signal line 48 is sandwiched by the power supply line 46 and the reference potential line 47 parallel and adjacent to them.

The connecting portion of the input signal line 48 with the input terminal 21S is sandwiched between the connecting portion of the power supply line 46 and positive power supply terminal 21 and the connecting portion of the reference potential line 47 and negative power supply terminal 21N. The input signal line 48, power supply line 46, and reference potential line 47 are extended up to the amplifier 51 without crossing each other and connected to the amplifier 51. Namely, the entire input signal line 48 is sandwiched by the power supply line 46 and the reference potential line 47. Note that a portion of the input signal line 48 may be sandwiched by the power supply line 46 and the reference potential line 47 as well.

Further, the terminal 21 passes through the opening 45a from the fixed end 21a side to the free end 21b side, then extended up to a position across the reference potential line 47 on the right side of the sheet surface of FIG. 4B. Accordingly, the fixed end 21a side of the input terminal 21S and the entire input signal line 48 are arranged in a region closed by the positive power supply terminal 21P, power supply line 46, negative power supply terminal 21N, and reference potential line 47 when seen from a planar view.

Figure 5:
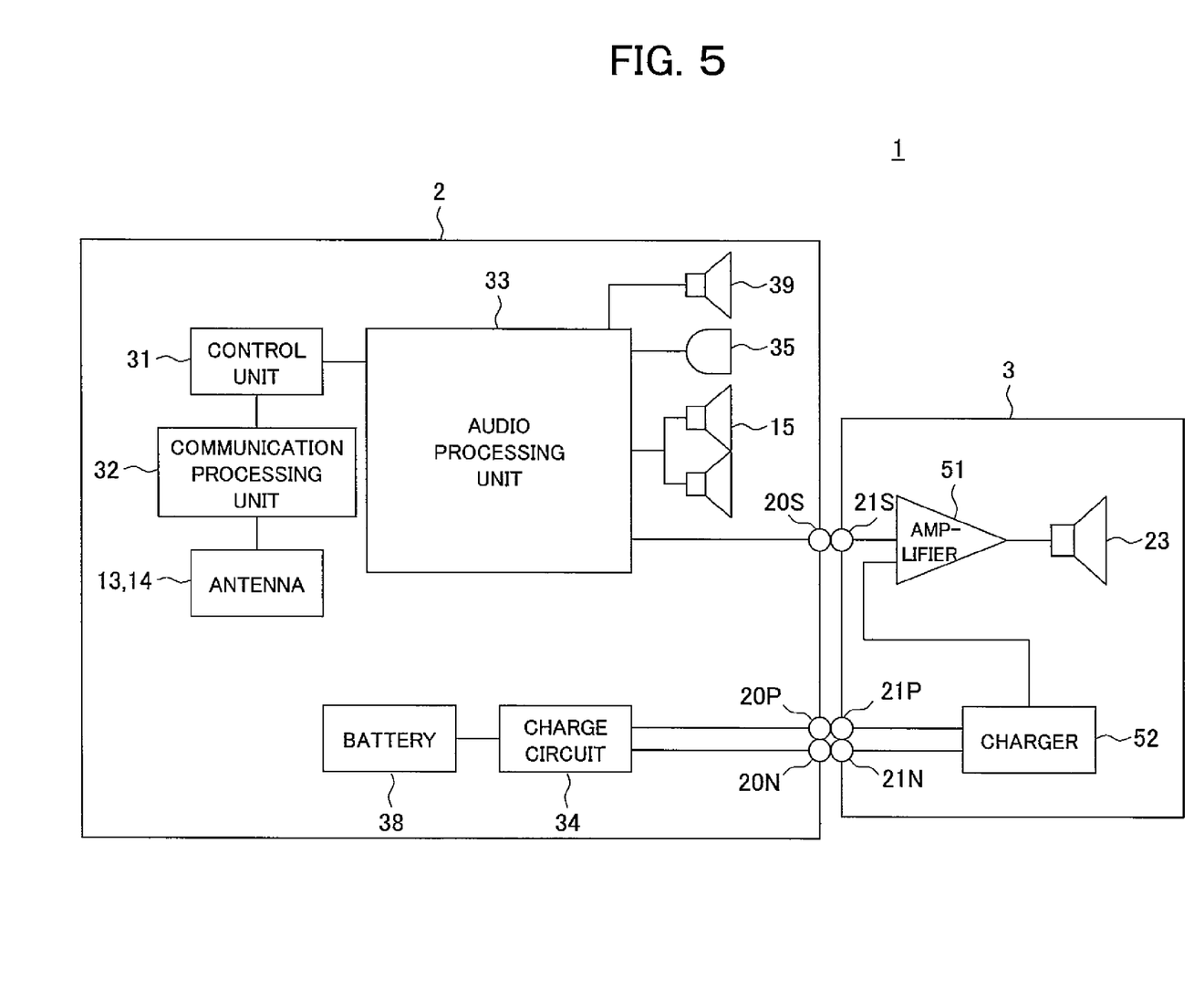
FIG. 5 A block diagram showing the configuration of a signal processing system of the portable electronic unit of FIG. 1A to FIG. 1C.

FIG. 5 is a block diagram schematically showing the configuration of a signal processing system of the mobile phone unit 1.

The mobile phone 2 is provided with a control unit 31 controlling operations of various types of electronic elements, a communication processing unit 32 for performing wireless communication, an audio processing unit 33 performing processing concerned with the audio output, and a charge circuit 34. Note that, the mobile phone 2 is provided with, other than these, various means such as an image processing unit converting video data from the control unit 31 to a video signal and outputting the same to the display unit 9, but illustration is omitted.

The control unit 31 is configured by for example an IC including a CPU, ROM, RAM, etc. The CPU executes a program stored in the ROM and controls operations of the communication signal unit 32, audio processing unit 33, etc. based on signals from the operation unit 12 etc.

The communication processing unit 32 includes a high frequency circuit and performs wireless communication utilizing radio waves. Specifically, the communication processing unit 32 modulates the audio data, image data, and other various data processed at the control unit 31 etc. and transmits the same via the main antenna 13. Further, the communication processing unit 32 demodulates signals received via the main antenna 13 and sub antenna 14 and outputs the same to the control unit 31 etc.

The audio processing unit 33 outputs an audio signal from the microphone 35 to the control unit 31. Further, the audio processing unit 33 performs mixing, amplification, etc. for an audio signal transmitted from another mobile phone via the communication processing unit 32 and control unit 31, an audio signal based on music data stored in an external storage device of the control unit, and so on and outputs the resultant signals to the speech use speaker 39, the speakers 15 utilized for reporting etc., and the output terminal 20S. Note that an audio signal fluctuates in its potential with a waveform similar to the waveform of an audio wave. Further, the speaker 23 can be arranged on the cradle device 3 side where smaller size is not required so much, therefore a large capacity speaker capable of outputting bass is employed. The speakers 15 are constituted by a small sized ones. Due to this, in the state where the cradle device 3 is connected, the audio processing unit 33 may divide an audio signal so that the two speakers 15 output sounds of a high range of a left channel and a right channel and the speaker 23 outputs a sound of low range.

The charge circuit 34 converts electric power supplied to the positive power receiving terminal 20P and the negative power receiving terminal 20N to electric power of an appropriate voltage and supplies the same to the battery 38 serving as the power source of the mobile phone 2. Further, it starts the charging (supply of electric power) to the battery 38 or interrupts the charging in accordance with the charging state etc. of the battery 38.

The parts 31 to 33 of the mobile phone 2 are driven by the supply of electric power from the battery 38. Note that when the mobile phone 2 and the cradle device 3 are connected for example during charging of the battery 38, these may be driven by the electric power supplied to the positive power receiving terminal 20P and the negative power receiving terminal 20N without interposing the battery 38. For example, electric power may be supplied from the charge circuit 34 to the parts 31 to 33.

The cradle device 3 is provided with the amplifier 51. The amplifier 51 amplifies an audio signal input via the input terminal 21S from the mobile phone 2 and outputs the same to the speaker 23. The speaker 23 converts the audio signal output from the amplifier 51 to sound and outputs it.

DC power input to the charger 52 and supplied via the cord 19 to the circuit inside the case 18 of the cradle device 3 is output to the positive power supply terminal 21P and the negative power supply terminal 21N and output to the amplifier 51. The amplifier 51 operates by the supply of electric power from the charger 52.

Figure 6:
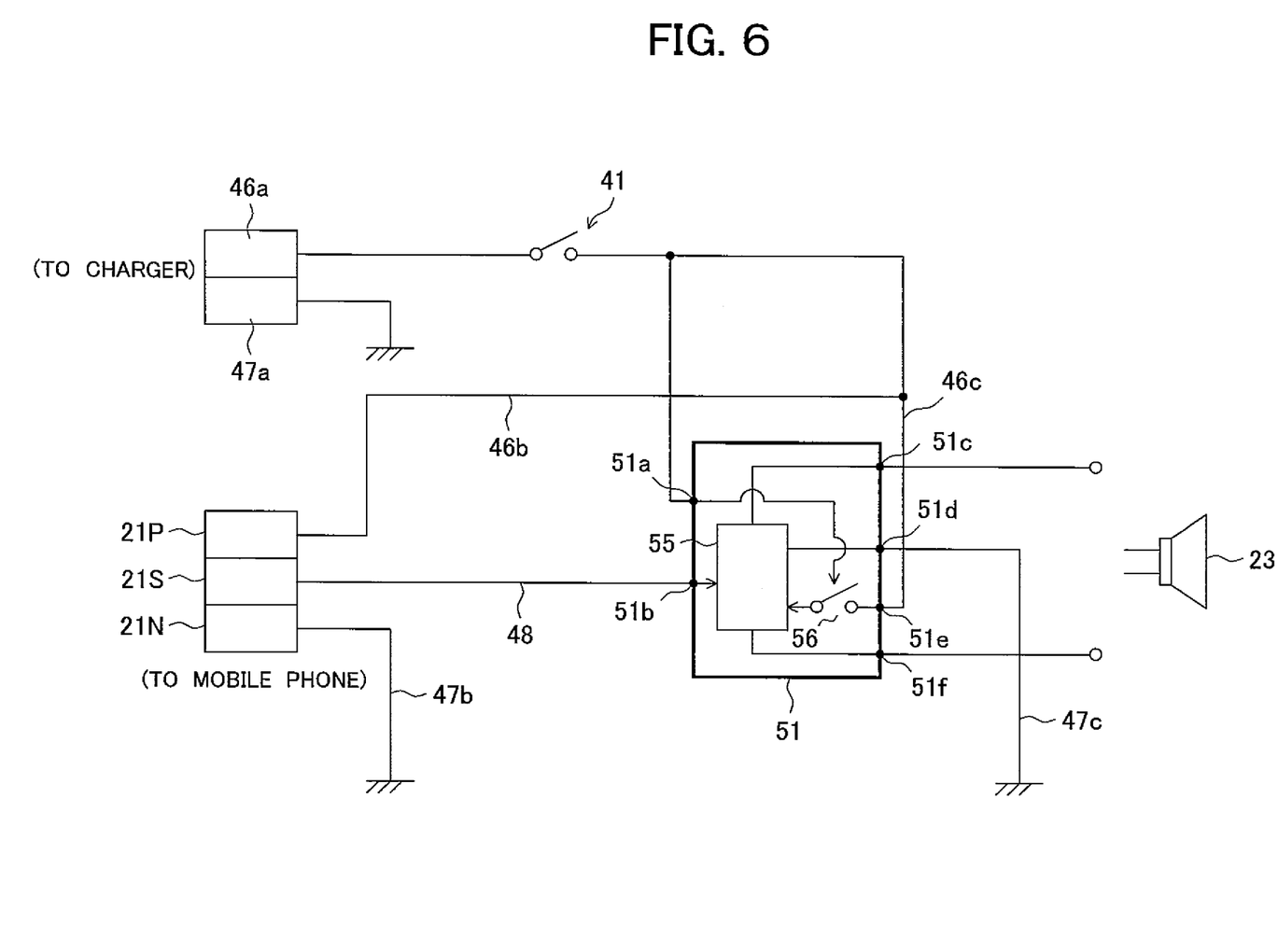
FIG. 6 A circuit diagram of the periphery of an amplifier of the cradle device of FIG. 1A to FIG. 1C.

FIG. 6 is a circuit diagram of the periphery of the amplifier 51. Note that, in FIG. 6, the configuration of the internal portion of the amplifier 51 is shown as a conceptual block diagram. Further, details such as a bypass capacitor etc. are omitted.

The amplifier 51 is configured by for example a so-called differential output type amplifier circuit, amplifies an electric signal input to the input terminal 51b by a pair of transistors 55 (shown as one block in FIG. 6), and outputs the same from a first output terminal 51c and a second output terminal 51f. The input terminal 51b is connected via the input signal line 48 to the input terminal 21S. The first output terminal 51c and second output terminal 51f are connected to the speaker 23.

The amplifier 51 applies a voltage applied to a power receiving terminal 51e to the transistor 55 and amplifies an electric signal input to the input terminal 51b. The transistor 55 amplifies an audio signal with an amplification ratio in accordance with the voltage applied from the power receiving terminal 51e. The power receiving terminal 51e is connected via the power supply lines 46 (46c) to the line having positive potential of the charger 52. Further, the mechanical switch 41 is provided between the power receiving terminal 51e and the charger 52. Note that the reference potential is obtained by the connection of a GND terminal 51d to the reference potential line 47 (47c).

Application of the voltage from the power receiving terminal 51e to the transistor 55 is controlled by the application of the voltage of the control terminal 51a. For example, a switching element 56 is provided between the power receiving terminal 51e and the transistor 55. The switching element 56 sets the power receiving terminal 51e and the transistor 55 to a conductive state where voltage of predetermined potential or more is applied to the control terminal 51a, while sets the power receiving terminal 51e and the transistor 55 to a non-conductive state where voltage of predetermined potential or more is not applied to the control terminal 51a. Accordingly, by the application of the voltage to the control terminal 51a, the transistor 55 is switched to an operation state or non-operation state. The control terminal 51a is connected via the power supply line 46 to the line having positive potential of the charger 52. Note that, the control terminal 51a and switching element 56 may be omitted as well.

The operation of the mobile phone unit 1 described above will be explained next.

When the transmitter case 6 of the mobile phone 2 is placed in the recess 25 of the cradle device 3 in a state where the charger 52 is connected to the external power source, the transmitter case 6 depresses the mechanical switch 41 of the cradle device 3, and the mechanical switch 41 becomes the ON state. Due to this, electric power is supplied from the charger 52 to the positive power supply terminal 21P and the negative power supply terminal 21N and the mobile phone 2 is charged. Along with this, electric power is supplied from the charger 52 to the power receiving terminal 51e and control terminal 51a of the amplifier 51, whereby the amplifier 51 becomes the operation state. Then, if an audio signal is input from the mobile phone 2 via the input terminal 21S to the input terminal 51b of the amplifier 51, an audio signal amplified by the transistor 55 is output via the first output terminal 51c and second output terminal 51f to the speaker 23, converted to sound by the speaker 23, and emitted.

On the other hand, if the mobile phone 2 is detached from the recess 25, the mechanical switch 41 becomes an OFF state. Due to this, the supply of electric power from the charger 52 to the positive power supply terminal 21P and the negative power supply terminal 21N is cut off. The supply of electric power to the amplifier 51 is cut off as well, whereby the amplifier 51 becomes the non-operation state.

According to the above embodiment, the input terminal 21S of the cradle device 3 is arranged while being sandwiched between the positive power supply terminal 21P and the negative power supply terminal 21S and adjacent to these. Therefore, noise entering into the input terminal 21S is guarded against by the positive power supply terminal 21P and the negative power supply terminal 21N, so noise entering into the input terminal 21S is reduced. Namely, an audio signal input to the input terminal 21S is one like AC where the potential fluctuates with a waveform similar to a waveform of an audio wave. However, in contrast, the electric power supplied to the positive power supply terminal 21P and the negative power supply terminal 21N is DC. Therefore, the input terminal 21S is surrounded by same potentials (constant potentials) and guarded from noise. Further, the input terminal 21S is guarded by the positive power supply terminal 21P and the negative power supply terminal 21N, therefore it is not necessary to provide a new member or form a multi-layer substrate in order to guard the input terminal 21S.

At least a portion of the power supply line 46 is extended along the input signal line 48. Therefore, in the same way as the input terminal 21S, noise entering into the input signal line 48 is guarded by the power supply line 46, whereby reduction of noise is achieved. In addition, the input terminal 21S is adjacent to the positive power supply terminal 21P, therefore noise can be guarded against by the positive power supply terminal 21P and the power supply line 46 without clearance even at a portion reaching the input signal line 48 from the input terminal 21S. Entry of noise is reliably prevented.

The input signal line 48 is sandwiched by the power supply line 46 and the reference potential line 47. Therefore, in the same way as the input terminal 21S, noise entering into the input signal line 48 is guarded against by the power supply line 46 and the reference potential line 47, whereby reduction of noise is achieved. In addition, the input terminal 21S is sandwiched by the positive power supply terminal 21P and the negative power supply terminal 21N, therefore noise can be guarded against without clearance by the positive power supply terminal 21P, negative power supply terminal 21N, power supply line 46, and reference potential line 47 even from the input terminal 21S to the input signal line 48, whereby entry of noise is reliably prevented.

The terminals 21 are formed by wire members and are formed by helical portions 21c, therefore, by a simple configuration, the terminals 21 and the terminals 20 of the mobile phone 2 can be reliably connected, and contact portions (free ends 21b) can be arranged at appropriate positions with respect to the circuit board 45. In this case, by extension of wire members from the circuit board 45 and further the formation of helical portions 21c, the possibility of entry of noise into the input terminal 21S becomes high. However, the terminals 21 are arranged parallel to each other so that the helical portions 21c are coaxially adjacent to each other, the input terminal 21S is reliably guarded by the positive power supply terminal 21P and the negative power supply terminal 21N, and reduction of noise is achieved.

The output terminal 20S of the mobile phone 2 is sandwiched by the positive power receiving terminal 20P and the negative power receiving terminal 20N. Therefore, in the same way as the input terminal 21S, it is guarded by the positive power receiving terminal 20P and the negative power receiving terminal 20N, and noise is reduced. Further, a new member etc. is not needed in order to guard the output terminal 20S, therefore a cost reduction, smaller size of the mobile phone 2, improvement of portability, etc. are achieved.

The signal output from the output terminal 20S of the mobile phone 2 to the input terminal 21S of the cradle device 3 is an audio signal, therefore is very AC like. Guarding by the positive power supply terminal 21P etc. effectively functions.

At the periphery of the connector 43, noise is apt to be generated by input/output of an electric signal at the connector 43. However, in contrast, the negative power receiving terminal 20N is provided at a position nearer the connector 43N than the output terminal 20S, therefore the output terminal 20S is guarded by the negative power receiving terminal 20N, whereby a reduction of noise is achieved. In other words, the connector 43 and the output terminal 20S can be arranged to be close to each other, so a reduction of size of the mobile phone 2 is achieved.

The present invention is not limited to the above embodiment.

The power supply device need only be one provided with terminals for supplying electric power and a terminal for inputting a signal and is not limited to one for charging a mobile phone. For example, it may also be one supplying electric power used for driving to an electronic device not having a battery.

The portable electronic device need only be one provided with terminals for receiving the supply of electric power from a power supply device and a terminal for outputting a signal to the power supply device and is not limited to a mobile phone. For example, it may be a notebook personal computer or PDA as well.

The operation unit of the power supply device need only be one operating based on a signal input to the input terminal and is not limited to an amplifier. For example, it may be a signal output unit such as an amplifier, equalizer, and filter which changes a signal input to the input terminal and outputs the same, may be a motor, a display unit, or other drive unit operating with reference to a signal input to the input terminal, or may be an information processing unit performing processing and storage in accordance with a signal input to the input terminal and processing information included in the signal.

The signal input to the input terminal need only be one transferring some information by fluctuation of potential and is not limited to an audio signal. For example, it may be a detection signal of a sensor, a control signal of a motor etc., or a video signal.

Note that the entire content of Japanese Patent Application No. 2006-040047 (filed on Feb. 16, 2006) is incorporated into the specification of the present application by reference.

The invention claimed is:

1. A power supply device comprising:
   a case;
   a first power supply terminal and a second power supply terminal exposed from the case;
   a power supply unit provided inside the case and configured to set the first power supply terminal and the second power supply terminal at different constant potentials;
   an input terminal exposed from the case and arranged between the first power supply terminal and the second power supply terminal adjacent to the first power supply terminal and the second power supply terminal; and
   an operation unit provided inside the case and configured to operate based on a signal input into the input terminal.

2. A power supply device as set forth in claim 1, comprising:
   a circuit board which is provided inside the case and on which a power supply line connecting the first power supply terminal and the power supply unit, a reference potential line connected to the second power supply terminal, and an input signal line connecting the input terminal and the operation unit are formed; wherein
   at least a portion of the power supply line extending along the input signal line.

3. A power supply device as set forth in claim 2, wherein at least a portion of the input signal line is arranged between the power supply line and the reference potential line.

4. A power supply device as set forth in claim 2, wherein the first power supply terminal, the second power supply terminal, and the input terminal are configured including conductive wire members,
   each conductive wire member has:
      a fixed end fixed to the circuit board,
      a free end exposed from the case and capable of oscillating in an inward and outward direction of the case, and
      a helical portion formed between the fixed end and the free end, and biasing the free end to the outward direction of the case by a restoration force in a winding direction or unwinding direction, and the first power supply terminal, the second power supply terminal, and the input terminal are arranged parallel to each other so that their helical portions are coaxially adjacent to each other.

5. A portable electronic device supplied with electric power from a power supply device having a case, a first power supply terminal and a second power supply terminal exposed from the case, a power supply unit provided inside the case and configured to set the first power supply terminal and the second power supply terminal at different constant potentials, an input terminal exposed from the case and arranged between the first power supply terminal and the second power supply terminal adjacent to the first power supply terminal and the second power supply terminal, and an operation unit provided inside the case and configured to operate based on a signal input into the input terminal, comprising:

a portable case;

a first power receiving terminal, a second power receiving terminal, and an output terminal exposed from the portable case, capable of abutting against and electrically connecting with each of the first power supply terminal, the second power supply terminal, and the input terminal when the portable case is attached to the power supply device;

a charge unit charging electric power supplied to the first power receiving terminal and second power receiving terminal to a battery connected to the portable case; and a signal generation unit driven by at least one electric power between electric power supplied to the first power receiving terminal and the second power receiving terminal and electric power from the battery, and configured to generate signals to be output to the output terminal.

6. A portable electronic device as set forth in claim 5, wherein the signal generation unit is configured to generate an audio signal.

7. A portable electronic device as set forth in claim 6, comprising:

a connector, provided in the portable case and capable of connecting between an internal circuit of the portable case and an external circuit of the portable case; wherein the first power receiving terminal or the second power receiving terminal is provided at a position nearer the connector than the output terminal.

* * * * *